United States Patent [19]

Geary

[11] Patent Number: 4,747,688

[45] Date of Patent: May 31, 1988

[54] FIBER OPTIC COHERENCE METER

[75] Inventor: Joseph M. Geary, Jupiter, Fla.

[73] Assignee: The United States of America as represented by the Secretary of the Air Force, Washington, D.C.

[21] Appl. No.: 911,935

[22] Filed: Sep. 26, 1986

[51] Int. Cl.$^4$ .............................................. G01B 9/02
[52] U.S. Cl. ..................................... 356/345; 356/354
[58] Field of Search .................... 356/345, 348, 354; 350/96.10

[56] References Cited

U.S. PATENT DOCUMENTS

| | | | |
|---|---|---|---|
| 3,639,063 | 2/1972 | Krogstad et al. | 356/106 |
| 3,879,988 | 4/1975 | Jacobs | 73/71.3 |
| 4,090,793 | 5/1978 | Lebduska | 356/205 |
| 4,265,539 | 5/1981 | Gaffard | 356/345 |
| 4,352,565 | 10/1982 | Rowe et al. | 356/360 |
| 4,495,411 | 1/1985 | Rashleigh | 250/227 |

OTHER PUBLICATIONS

Iiyama et al., "Optical Field Mapping . . . Fibers", Applied Optics, vol. 17, No. 12, pp. 1965–1971, Jun. 15, 1978.
Iiyama et al. "Optical Field Mapping . . . Fibers", Nachrichtentech Z (NTZ), Germany, vol. 31, No. 2, Feb. 1978, pp. 138–139.

Primary Examiner—Eugene R. LaRoche
Assistant Examiner—Seung Ham
Attorney, Agent, or Firm—Donald J. Singer; William Stepanishen

[57] ABSTRACT

An incident light field is applied to the two separate front fiber faces of a pair of identical optical fibers which are initially held in a common plane. One fiber face is always kept stationary. The other fiber face may be moved either laterally in a plane common to the stationary face, or longitudinally into and out of the common plane. The output end of the device comprises two separate rear fiber faces that are held in a common plane. These faces are stationary. There is no lateral or longitudinal motion of one relative to the other. The light emerging from these two faces interferes in the far field. Straight line interference fringes whose spacing depends upon the lateral separation of the rear fiber faces are formed. The fringe modulation, however, depends upon the relative position of the front fiber faces. This modulation changes as one front face is scanned either laterally or longitudinally. The modulation changes with such motion is related to the degree of spatial or temporal coherence of the incident light field.

12 Claims, 1 Drawing Sheet

FIBER OPTIC COHERENCE METER

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an apparatus for measuring the coherence of a light field, and in particular to a fiber optic coherence meter.

The design and use of optical interferometers, devices in which interference of light is used as a tool in metrology and spectroscopy. These uses include precise measurements of wavelength, the measurement of very small distances and thicknesses by using known wavelengths, the detailed study of the hyperfine structure of spectrum lines, the precise determination of refractive indices, and, in astronomy, the measurement of binary-star separations and the diameters of stars. Optical interferometers are based on both two-beam interference and multiple-beam interference. They are also based on wavefront splitting and amplitude splitting.

One of the more well known interferometers is the Michelson interferometer. The principle of operation of the Michelson interferometer is based on amplitude splitting. Light rays from a narrow-angle source are incident at 45° on a 50% partially reflecting plate, $P_1$. Half the light is transmitted through plate $P_1$ to a first mirror, $M_1$ which reflects the light back to the 50% reflecting plate $P_1$. The light which is reflected by the reflecting plate $P_1$ proceeds to a second mirror, $M_2$ which reflects it back to the 50% reflecting plate, $P_1$. At plate $P_1$, the two waves are again partially reflected and partially transmitted, and a portion of each wave proceeds to the receiver, R which may be a screen, a photocell, or a human eye. Depending on the difference between the distances from the beam splitter (plate $P_1$) to the mirrors $M_1$ and $M_2$, the two beams will interfere constructively or destructively. A plate $P_2$ is sometimes positioned between plate $P_1$ and mirror $M_1$ to compensate for the thickness of $P_1$.

When the mirrors' images are completely parallel, the interference fringes are circles. The reflectivity of the mirrors in the Michelson interferometer can be made as high as desired, and the interference will still be two-beam interference. The intensity of the fringes can accordingly be made very great. If the mirrors are slightly inclined about a vertical axis, vertical fringes are formed across the field of view. These fringes can be formed in white light if the path difference in part of the field of view is made zero. Just as in other interference experiments, only a few fringes will appear in white light, because the difference in path will be different for wavelengths of different colors. Accordingly, the fringes will appear colored close to zero path difference, and will disappear at larger path differences where the spectral separation of the successive regions of constructive interference is too close for the eye to see colors. If there is a one-half cycle relative phase shift at the beam splitter, the fringe of zero path difference is black, and can be easily distinguished from the neighboring fringes. This makes use of instrument relatively easy. The sensitivity to weak lines and resolution of the interferometer is thus potentially very much greater than that of an optical spectrometer.

The state of the art of interferometry is well represented and alleviated to some degree by the prior art apparatus and approaches which are disclosed in the following U.S. patents:

U.S. Pat. No. 3,639,063 issued to Krogstad et al on Feb. 1, 1972;
U.S. Pat. No. 3,879,988 issued to Jacobs on Apr. 29, 1975;
U.S. Pat. No. 4,090,793 issued to Lebduska on May 23, 1978;
U.S. Pat. No. 4,265,539 issued to Gaffard on May 5, 1981;
U.S. Pat. No. 4,352,565 issued to Rowe et al on Oct. 5, 1982; and
U.S. Pat. No. 4,495,411 issued to Rashleight on Jan. 22, 1985.

The Krogstad et al reference discloses an interference fringe movement detector for sensing interference pattern fringe movement or pattern shifts in which a radiation interference pattern is deflected by a galvanometer mirror to illuminate two photoelectric cells with selected portions of the interference pattern. However, none of the references suggest moving the front end of one fiber in an identical fiber pair to obtain both spatial and temporal coherence of an incident light field.

The Jacobs reference provides an optical comparator for measuring small surface vibrations on a rotating object using coherent optical techniques. By increasing coherence, the apparatus sensitivity is increased to the point where measurements on nonspecular surfaces can be achieved.

The Lebduska reference is an example of the use of side-by-side light conductors in a system for measuring packing graction and therefore the transmission efficiency of a fiber optic cable.

The Gaffard reference discloses a device which measures the mutual coherence function of a laser beam. A screen with openings is used to pass pencils of light taken from the laser beam. The pencils pass through a modulator and are then compared with a reference pencil of light. The average amplitude values and average phase values are representative of the amplitude and of the phase of mutual coherence function relating to the points of the cross section of the laser beam which correspond to the openings of the screen. This is described as a measure of the time coherence of the laser beam.

The Rowe et al patent discloses a speckle pattern interferometer employing a laser beam that is split into reference and object beams having substantially the same optial path lengths. The object beam is reflected from a vibrating object under investigation and the reference beam passes through an optical fiber cut to the proper length to equalize the length of the reference beam path with that of the object beam.

The Rashleigh patent demonstrates the use of identical side-by-side optical fibers to measure physical quantities. The fibers which are highly birefringent are oriented with their fast axes perpendicular to each other. When subjected to stress caused by a physical quantity acting on fibers through a transducer, the birefringence of each of the two fibers is asymmetrical altered thereby rotating the states of polarization of coherent light signals passing through the two fibers in a common direction. Environmental perturbations symmetrically alter birefringence of each of the fibers thereby rotating the states of polarization of the light signals in opposite directions. The states of polarization of the light signals emanating from the two fibers are detected and combined such that the changes due to the physical quantity enhance each other while the changes due to environmental perturbations are cancelled.

At present, the output of a large number of small laser beams are often combined so as to provide a single higher energy laser beam. In order to determine the output characteristics of the combined beam, a psuedo Youngs two aperture interferometer is employed to monitor the coherence of the radiation in the beams.

When utilizing known interferometer techniques, the beam to be monitored must be sampled by means of a mirror that is placed in the beam path to reflect a beam sample out to the interferometer used to measure coherence. This means that a disruptive fractor is placed in the beam path, i.e., a mirror having a cross section in the square inches range. In contrast to this, if the instrument of this invention is used, the cross sectional disruptments are only in the thousandnths of an inch. In order to measure the spatial and temporal coherence of an incident light field, the prior art normally requires the use of two distinct types of interferometers, e.g. Young's interferometer for spatial coherence, Michelson's interferometer for temporal coherence. The present invention solves this problem by measuring the spatial and temporal coherence of an incident light field with a single device.

SUMMARY OF THE INVENTION

The present invention utilizes a pair of optic fibers for measuring both the spatial and temporal coherence of an incident light field. The front fiber face of one of the pair of identifical optical fibers is kept stationary while the other fiber front face may be moved either laterally in a plane common to the stationary face or, longitudinally into and out of the common plane in order to measure either spatial or temporal coherence. The output ends of the optic fibers are kept stationary. The light which emerges from these ends of the optic fibers, interferes in the far field. The amount of fringe modulation in the interference pattern changes as the moveable front face is scanned either laterally or longitudinally. The amount that the modulation changes with respect to the scanning motion, is related to the degree of spatial or temporal coherence of the incident light field.

It is one object of the present invention, therefore, to provide an improved fiber optic coherence meter.

It is another object of the invention to provide an improved fiber optic coherence meter wherein fiber optic conductors are used to establish interference patterns.

It is another object of the invention to provide an improved fiber optic coherence meter which utilizes the method of scanning an incident light field with the front face of one of a pair of optic fibers while keeping both rear faces fixed.

It is another object of the invention to provide an improved fiber optic coherence meter wherein a single device is utilized to measure both spatial and temporal coherence.

It is another object of the invention to provide an improved fiber optic coherence meter wherein the spatial and temporal coherence of an unknown light field may be determined.

It is another object of the invention to provide an improved fiber optic coherence meter which may be used as part of a phase sensing scheme in optical phased array and provides an unobstrusive beam sampling capability.

These and other advantages, objects and features of the invention will become more apparent from the following description taken in connection with the illustrative embodiment in the accompanying drawings.

DESCRIPTION OF THE PREFERRED EMBODIMENT

Figure 1:
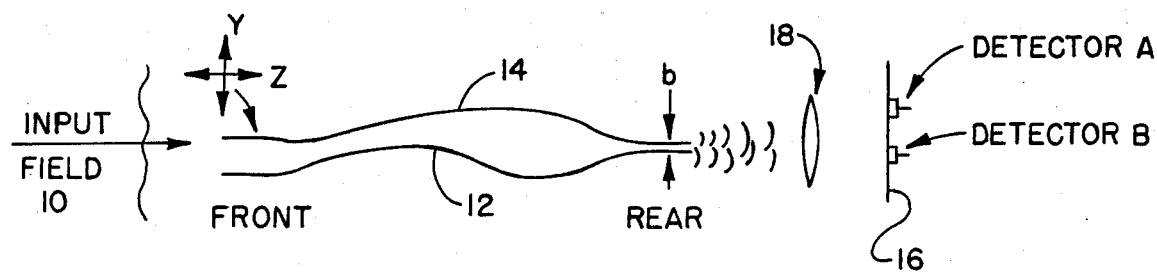
FIG. 1 is a schematic diagram of the fiber optic coherence meter according to the present invention.

Turning now to FIG. 1 there is shown a schematic diagram of the fiber optic coherence meter. An input light field 10 is directed at the front faces of a pair of fiber optic conductors 12, 14 which are arranged side by side and have the same physical length. The front faces of the fiber optic conductors are initially positioned in a common plane. The front face of fiber optic conductor 12 is fixed to remain stationary in the common plane. The front face of fiber optic conductor 14 may be moved either laterally in the common plane or longitudinally into and out of the common plane. A typical test configuration would be one wherein both conductors are positioned on a table to establish a horizontal reference plane. Thus, the relative horizontal relationship between the conductors 12, 14 would be maintained during a measurement procedure when the front face of fiber optic conductor 14 is moved either laterally or longitudinally. The lateral motion of the front face of fiber optic conductor 14 provides a measure of the spatial coherence of the input light field 10. The longitudinal motion of conductor 14 measures the temporal coherence of the input light field 10.

The two fiber optic conductors 12, 14 are equal in length and are arranged such that their rear faces are in a common plane. The rear faces of the fiber optic conductors 12, 14 are fixed relative to one another and have a lateral separation, b. The fringe spacing of the interference pattern that is obtained from the two fiber optic conductors 12, 14, is dependent on the lateral separation b. An observation plane, 16 is established at a point in alignment with the distance from the rear faces of the fiber optic conductors 12, 14.

A pair of detectors A, B are positioned in the observation plane 16 to detect the interference pattern. The distance between the observation plane 16 and the rear faces of the conductors 12, 14 is not critical and is determined by the relative spacing between the detectors A, B. The detectors A, B may comprise any readily known and commercially available light detector such as film, CCD arrays, video camera etc. A linear image intensifier, such as magnifier lens 18 may be utilized between the rear faces of conductors 12, 14 and the observation plane 16 to enlarge and defocus the light images.

Figure 2:
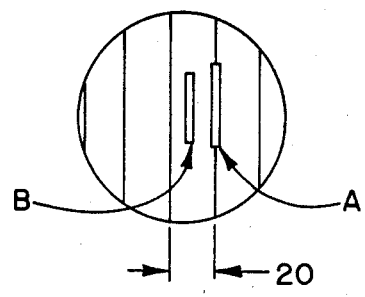
FIG. 2 is a pictorial end view of an interference fringe pattern that may be obtained by using the present invention.

Referring now to FIG. 2, there is shown a pictorial representation of a typical inteference pattern that may be formed in the observation plane 16. For reference, detectors A, B are shown schematically. The detectors A, B are positioned in the observation plane such that detector A measures the dark fringe and detector B measures the light fringe. The fringe spacing 20 is dependent upon the lateral separation, b of the rear faces of the fiber optic conductors 12, 14. The fringe contrast or modulation is dependent upon the relative position of the front face of fiber optic conductor 14 which is moveable, and the coherence of the input light field, 10.

The fiber optic coherence meter operates in the following manner:

1. Two glass fibers of identical design, composite material and length are utilized. It is best if the optic fibers are uncladded. The front and rear faces of the optic fibers must be flat (accurately cleaved).

2. Mount the front face of one fiber optic conductor so that it faces the incident light field, and is held fixed.

3. Mount the front face of the second fiber optic conductor so that it also to faces the incident light field. This fiber optic conductor may be mounted on an X-Y translation stage to more easily permit lateral and longitudinal motion.

4. Both front face mounts should allow the optic fibers to be able to touch each other sideways as one extreme of the lateral motion scale.

5. The rear faces of each fiber optic conductor should be mounted so that the faces lie in a common plane, and have some degree of freedom to permit some relative lateral adjustment to allow fringe spacing selection. Once the fringe spacing selection is established, both rear fiber ends are maintained in a fixed position.

6. A microscope may be used to view a region of overlap of the two light fields emerging from the rear fiber end faces. Note that the microscope does not image these end faces.

7. The observation plane contains two detectors A and B. Detector A measures the intensity in the dark fringe while detector B measures the intensity in the light fringe. The visibility is determined from the following equation:

$$V(x,z) = \left| \frac{I_A - I_B}{I_A + I_B} \right|$$

8. The visibility may be calculated for various lateral y positions or longitudinal Z positions. The visibility is directly related to the degree of coherence of the light field (if the intensities incident on the front fiber faces are equal). The degree of coherence is represented by a number which has a value between zero and one. A value of one means perfect coherence. A value of zero means no coherence.

9. It may be necessary when examining certain ambient light fields to boost the output of the observation plane via a linear image intensifier (magnifier) prior to using detectors A and B.

Although the invention has been described with reference to a particular embodiment, it will be understood to those skilled in the art that the invention is capable of a variety of alternative embodiments within the spirit and scope of the appended claims.

What is claimed is:

1. A fiber optic coherence meter comprising in combination:
    an input light field,
    first and second fiber optic conductors having identical length, said first and second fiber optic conductors respectively have front and rear faces, said front faces of said first and second fiber optic conductors receiving said input light field, said front faces of said first and second fiber optic conductors being arranged to form a first common plane, said first fiber optic conductor being held stationary with respect to said second fiber optic conductor which can be moved either laterally in said first common plane or or longitudinally into and out of said first common plane, said rear faces of said first and second conductors being arranged to form a second common plane and having a lateral separation b, said rear faces being fixed with respect to each other to maintain said lateral separation b once it has been established,
    an observation plane parallel to said second common plane, said observation plane having positioned therein a first and second light detector, said input light field traveling through said first and second fiber optic conductors to form a first and second light field which emerges from said rear faces thereof, said first and second light fields interacting in said observation plane to form an interference pattern, said first and second light detectors detecting said interference pattern to determine the degree of coherence in said input light field.

2. A fiber optic coherence meter as described in claim 1 further including a linear image intensifier to intensify said interference pattern in said observation plane, said linear image intensifier being positioned between said rear faces and said observation plane.

3. A fiber optic coherence meter as described in claim 1 wherein said first and second fiber optic conductor comprise the same material composition and are uncladded.

4. A fiber optic coherence meter as described in claim 1 wherein said first and second fiber optic conductors comprise the same length and identical design.

5. A fiber optic coherence meter as described in claim 1 wherein said front and rear faces are accurately cleaved flat.

6. A fiber optic coherence meter as described in claim 1 wherein said lateral separation b may be varied.

7. A fiber optic coherence meter as described in claim 1 wherein said second fiber optic conductor is mounted on an X-Y translation stage to provide lateral and longitudinal motion.

8. A fiber optic coherence meter as described in claim 1 wherein said interference pattern comprises alternating light and dark fringes.

9. A fiber optic coherence meter as described in claim 2 wherein said linear image intensifier comprises a magnifier lens.

10. A fiber optic coherence meter as described in claim 8 wherein the visibility of said inteference pattern is determined by the equation:

$$V(x,z) = \left| \frac{I_A - I_B}{I_A + I_B} \right|$$

where $I_A$ is the intensity of the dark fringes and $I_B$ is the intensity of the light fringes.

11. A fiber optic coherence meter as described in claim 8 wherein said visibility is directly related to the degree of coherence of said input light field.

12. A fiber optic coherence meter as described in claim 11 wherein said degree of coherence is a number with a value between zero and one, wherein perfect coherence is a one, and zero is no coherence.

* * * * *